(12) United States Patent
Bakos et al.

(10) Patent No.: US 9,794,762 B2
(45) Date of Patent: Oct. 17, 2017

(54) SYSTEM, METHODS, SOFTWARE, AND DEVICES EMPLOYING MESSAGING

(75) Inventors: Balazs Bakos, Torokbalint (HU); Jukka K. Nurminen, Espoo (FI); Attila Kiss, Szekesfehervar (HU); Zoltan Ivanfi, Godollo (HU); Gyula Kun-Szabo, Budapest (HU); Douglas Deeds, Bedford, TX (US)

(73) Assignee: NOKIA TECHNOLOGIES OY, Espoo (FI)

( * ) Notice: Subject to any disclaimer, the term of this patent is extended or adjusted under 35 U.S.C. 154(b) by 900 days.

(21) Appl. No.: 11/529,756

(22) Filed: Sep. 27, 2006

(65) Prior Publication Data

US 2007/0083600 A1 Apr. 12, 2007

Related U.S. Application Data

(60) Provisional application No. 60/724,522, filed on Oct. 6, 2005.

(51) Int. Cl.
| | |
|---|---|
| *G06F 15/16* | (2006.01) |
| *H04W 4/12* | (2009.01) |
| *G06Q 10/10* | (2012.01) |
| *H04L 12/58* | (2006.01) |
| *H04M 1/725* | (2006.01) |
| *H04W 88/02* | (2009.01) |
| *H04W 88/18* | (2009.01) |

(52) U.S. Cl.
CPC ............ *H04W 4/12* (2013.01); *G06Q 10/107* (2013.01); *H04L 51/36* (2013.01); *H04L 51/38* (2013.01); *H04M 1/72547* (2013.01); *H04W 88/02* (2013.01); *H04W 88/184* (2013.01)

(58) Field of Classification Search
USPC .................................................. 709/203, 206
See application file for complete search history.

(56) References Cited

U.S. PATENT DOCUMENTS

| | | | |
|---|---|---|---|
| 7,426,652 B2* | 9/2008 | Liccione et al. ................. 714/3 |
| 2001/0046851 A1 | 11/2001 | Yamaguchi | |
| 2002/0152220 A1 | 10/2002 | Kang et al. | |
| 2002/0174195 A1* | 11/2002 | Meyer et al. ................. 709/219 |
| 2004/0064511 A1* | 4/2004 | Abdel-Aziz et al. ......... 709/206 |

(Continued)

FOREIGN PATENT DOCUMENTS

| | | |
|---|---|---|
| EP | 1420554 | 5/2004 |
| WO | WO 2005/008984 A1 | 1/2005 |

OTHER PUBLICATIONS

Paul Thurrot's SuperSite for Windows: WIN HEC 2004 Longhorn Prototypes Gallery, http://www.winsupersite.com/showcase/longhorn_winhec_proto.25p#, pp. 1-7, printout of Aug. 26, 2005.

(Continued)

*Primary Examiner* — Glenford Madamba
(74) *Attorney, Agent, or Firm* — Ditthavong & Steiner, P.C.

(57) ABSTRACT

A mobile device is shown in the role of a centralized message transfer agent wherein it manages all messaging for a user for most if not all the time so as to provide a unified messaging approach across all messaging platforms. Other platforms are shown using the mobile device in this unified way. Related systems, methods, integrated circuits, and software are also shown.

49 Claims, 6 Drawing Sheets

(56) References Cited

U.S. PATENT DOCUMENTS

| | | | |
|---|---|---|---|
| 2004/0137884 A1* | 7/2004 | Engstrom | H04L 12/586 455/414.1 |
| 2004/0207719 A1* | 10/2004 | Tervo et al. | 348/14.02 |
| 2005/0197101 A1* | 9/2005 | Gupta | 455/410 |
| 2006/0168057 A1* | 7/2006 | Warren et al. | 709/206 |
| 2006/0179466 A1* | 8/2006 | Pearson et al. | 725/109 |

OTHER PUBLICATIONS

Detail of Longhorn Contacts, http://www.winsupersite.com/impage/showcase/ih_winhec_proto_10.jpg, printout of Aug. 26, 2005, p. 1 of 1.

Detail of Communications History, p. 1 of 1, printout of Aug. 30, 2005, http://www.winsupersite.com/images/showcase/ih_winhec_proto_08.jpg.

Detail of Longhorn SyncManager, p. 1 or 1, printout of Aug. 30, 2005, http://www.winsupersite.com/images/showcase/ih_winhec_proto_16.jpg.

RFC 2060, Internet Message Access Protocol—Version 4rev1, Dec. 1996, M. Crispin, University of Washington, pp. 1-72.

RFC 1939, Post Office Protocol—Version 3, J. Meyers et al, May 1996, pp. 1-22.

RFC 821, Simple Mail Transfer Protocol, J.B. Postel, Aug. 1982 pp. 1-64.

"Goals for Internet Messaging to Support Diverse Service Environments draft-ietf-lemonade-goals-05" by J. Wong, Ed., Nortel Networks, Dec. 17, 2004, Lemonade Working Group, Internet-Draft, XP015038559, pp. 1-51.

Dorot V., Explanatory Dictionary on Modern Computer Terms, Saint-Petersburg, BHV-Peterburg, 2004, pp. 318, 446.

Gwenael Le Bodic et al., Mobile Messaging Technologies and Services: SMS, EMS and MMS), Moscow, Kudits-Obraz, 2005, p. 16.

Russian Office Action for corresponding RU Application No. 2008112562/09(013587), Feb. 9, 2010, Russia.

Chinese Office action for corresponding CN App. No. 200680036938.2 dated Jun. 11, 2010, pp. 1-8.

Mexican Office action for corresponding MX App. No. MX/a/2008/004464 dated Jun. 11, 2010, pp. 1-4.

Korean Office Action for corresponding KR Application No. 10-2008-7008122, Sep. 23, 2009, Korea.

Russian Office Action for corresponding RU Application No. 2008112562/09(013587), Sep. 11, 2009, Russia.

Chinese Office action for corresponding CN App. No. 200680036938.2 dated Dec. 14, 2010, pp. 1-6.

Chinese Office Action for corresponding CN Application No. 200680036938.2, Sep. 22, 2011, pp. 1-20.

Chinese Office action for corresponding CN App. No. 200680036938.2 dated May 18, 2011, pp. 1-22.

European Office Action for corresponding EP Application No. 06820763.8-2416, Jun. 10, 2011, pp. 1-6.

Supplementary European Search Report for corresponding EP Application No. 06820763.8-2416/1932301, Jun. 6, 2011, pp. 1-3.

* cited by examiner

| State | Commands | Comment |
|---|---|---|
| Initial | - | The GUI checks if there is a running instance of the associated server and depending on the result enters 'Stopped' or 'Disconnected' state. |
| Stopped | Start | The GUI starts a new instance of the associated server and enters 'Disconnected' state. |
| | Exit | The GUI exits. |
| Disconnected | Connect | The GUI finds the running instance of the corresponding server, attaches to the found instance and changes to 'Connected' state. |
| | Stop | The GUI finds the running instance of the associated server and stops it, then changes to 'Stopped' state. |
| | Exit | The GUI exits, The associated server keeps running unattended. |
| Connected | Disconnect | The GUI detaches from the server instance. The server keeps running unattended.<br><br>The GUI changes to 'Disconnected' state. |
| | Stop | The GUI disconnects from the server instance and stops it, then changes to 'Stopped' state. |
| | Exit | The GUI detaches from the server instance and exits. The server keeps running unattended. |

FIG. 5

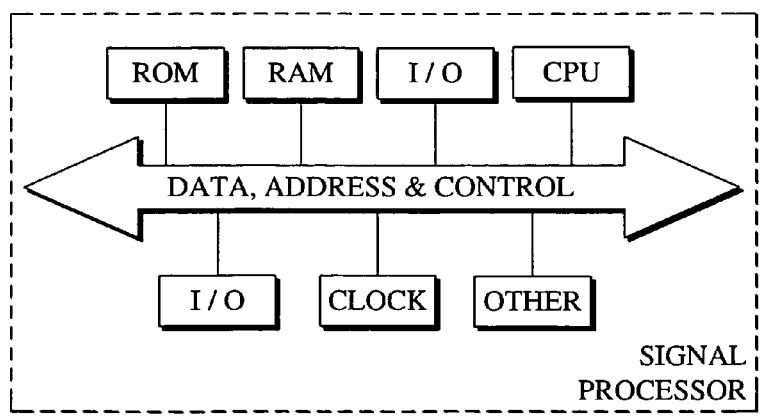

FIG. 7

SYSTEM, METHODS, SOFTWARE, AND DEVICES EMPLOYING MESSAGING

CROSS-REFERENCE TO RELATED APPLICATION

This application claims priority from U.S. Provisional Application Ser. No. 60/724,522 filed Oct. 6, 2005.

BACKGROUND OF THE INVENTION

1. Technical Field

The field of the invention relates to telecommunications and, more particularly, to messaging between users of a telecommunications system.

2. Discussion of Related Art

Phone calls, SMSs and e-mails are widely used for communicating. Most people use all of them regularly. These technologies are complementary but not coordinated.

SMSs are particularly suitable for small-screen portable devices. For e-mail, the user interface and memory capacity of mobile phones and PDAs have somewhat limited usability as compared to a desktop or laptop PC due to their restricted size especially as concerns the larger screen and keyboard of a desktop or laptop computer. For simple convenience, some access of e-mail will typically be convenient and will be performed using the limited user interface of smart mobile phones. However, when required to perform longer tasks with e-mail many users tend to use the superior user interface and memory of desktop or laptop PCs as the primary access method for mobile e-mail. It has been projected that 80% of all access at mobile hotspots 2008 will still be through laptops, not mobile handsets. It is thus desirable to provide new features in mobile phones to improve the functionality of the phone when used in conjunction with a laptop or PDA.

Some problems are that:
a) Current implementations of e-mail software on mobile phones allow for the download of e-mail headers or complete e-mails which can then be read, replied, etc. using the phone interface.
b) If the e-mails are downloaded to the phone for reading, responding, etc. they are either removed from the server or left on the server (user's choice).
c) If e-mails are removed from the server, the user cannot subsequently download them to a laptop or other device, then use the device with the better user interface to read, respond to, delete, etc. the e-mails.
d) If e-mails are left on the server, the laptop or other device must re-download the e-mails doubling the use of bandwidth, even though the e-mails may be available locally on the mobile phone.

Even though one can use phone calls, SMSs and e-mails, people cannot handle these communication forms in a common way. As described above, phone calls and SMSs can be handled and archived on the phone, while e-mails can at the same time be handled and archived on a desktop or laptop PC with some user coordination required. Both the phone and the PC use their own set of contacts and the user needs to take care of synchronization. It is difficult (or even impossible) with prior art technology to reply to a phone call or SMS with Internet e-mail or vice versa. It would be useful to have a single communication center that would handle all the communication that the person is having, no matter what mechanism has been used for it. Furthermore, when the communication data is distributed (part of the data is stored in the phone and part in the computer) it is hard to search for all communication that has been conducted with a certain person.

Users are not able to follow work-related electronic conversations if they are far from their own desk. Messages from different sources are not handled in a consistent manner and messaging clients have to be changed to communicate with different types of messages. It is not easy or sometimes even possible to answer a message using a different medium, e.g., to send notes written during a phone call and the recorded call as well to the caller in an email. When using a cell phone for certain types of cell phone related messages, the user would prefer to use a large screen and keyboard of any desktop computer nearby (pool computers, home computer, laptop, etc.) instead of the small size peripherals of the mobile terminal. Nonetheless the user would like to have access to the user's correspondence even if there is no desktop computer available. It is true though that the user would prefer to avoid use of existing 1-to-1 synchronization solutions because of the number of the visited locations and used computers.

In the industry, there are plans to develop a communication history type of functionality. According to such plans, the idea is to provide an integrated contact management application but with a PC-centric approach. These plans include the eventual objective of enabling a PC user to connect Contacts to numerous portable devices (like cell phones) through a synchronization management infrastructure, to connect electronically with nearby contacts for peer-to-peer collaboration and file sharing, and to perform other duties which are either impossible today or require an extensive collection of third party software, much of which doesn't currently work together. A "Communication History" view is planned which will chronologically detail all of the phone, email, instant messaging (IM), peer-to-peer, or other conversations a person has had with contacts. Sorting by date, rating, message type, and other criteria is also contemplated. A mobility center that would act as an activity center for future mobile computers that will provide a handy front-end to touch all things needed by a mobile user. It appears that software tools are under development that are to be tied to PC operating systems.

BRIEF SUMMARY OF THE INVENTION

An object of the present invention is to provide messaging in a way that is unified across platforms of differing types.

Another object is to provide multi-messaging centered on a mobile device.

Yet another object is to enable increased messaging usage in mobile devices.

The present invention thus aims to solve the problem of users of today's messaging facilities: different types of messages require the usage of different hardware devices and several separate and non-interoperable software packages with different addressing schemes, while their ultimate raison d'être is the same basic principle: to deliver a message to the addressee.

The main idea of the present invention is to provide a mobile device in a new role, i.e., that of a centralized mail manager or message transfer agent. In that new role it can manage all messaging for most if not all the time. The user can have all his messages in the mobile device and other clients can connect to the mobile device to display/edit/send messages. Despite the user interface and memory limitations of today's portable devices described above, it appears that great strides are being made to improve both the user interface and the memory capacity of such devices. It can be foreseen that new functionalities will become possible.

According to the present invention, a mobile-centric, multi-messaging type functionality is provided using currently existing standards and existing applications. Instead of using just one tool, the user is free to choose any email client application and use it on any platform. An embodiment comprises two main parts: an SMTP proxy and a POP/IMAP proxy server. Optionally an LDAP proxy server can be implemented to enhance addressing capabilities of the clients. Customization of the client side might be necessary to be able to fully use the offered functions.

A mobile device such as a phone can publish its call log, MMS, SMS, email and other related data and functionality through standard protocols traditionally used for e-mail. Current phone models support POP3, IMAP, SMTP client protocols. However they do not support the server side of these protocols. Implementing mail server protocols on mobile devices such as cell phones can enable new kinds of applications. Existing e-mail clients can be configured to use these phone services.

Such a client provides at least the following functionalities: (a) receiving and sending messages (SMS, MMS, email, instant messages), (b) log of incoming and outgoing calls and messages, (c) recordings of voice calls, (d) sending a pre-recorded voice message through e-mail, (e) IRC sessions, (f) phonebook, and (g) calendar.

Using these via an email client would allow several benefits to the user: (a) User's "all communications" history is made available in a single device using multiple existing protocols, (b) Email client may offer increased usability e.g. full qwerty keyboard and 17" screen for reading and writing messages, (c) The search tools e.g. finding email or Google desktop search can find all communications including phone calls, (d) Using different media for mixed communication gets easier, e.g., answering a phone call with an email message, and (e) Storing and backing up all communications history is possible.

An open approach using standard protocols encourages innovation by the community of email clients built on top of the inventive functionality. The solution preferably uses existing standard protocols in order to be able to connect to the existing communications networks. Different characteristics of the different protocols used when sending messages should be well hidden from the user.

In one use case the user would use the push email solutions to get the email messages to his phone. The user could look at the titles immediately and using the mobile device evaluate the most urgent or small issues on the road. Later in the office, in some public hotspot e.g. hotel's business center, or using his own laptop in the hotel room the user would use the email client in the computer to read those email messages that are long, contain attachments that are hard to use on phone, or that require access to users own data. The last step is enabled by the innovation.

Another possibility is that users are able to send email to each other using a proximity network. E.g. two roaming colleagues could avoid the slow and potentially expensive emailing via a faraway company server.

This would also reduce the need for different transfer mechanisms. Everything would be email and all the application could take advantage of the email platform.

The messages could be routed in the most optimal way: via phone over cellular, via a computer connected to the fixed internet, or via a proximity network.

In an emerging market scenario with limited fixed connections a group of people could share a single phone for their email communications. Each user could have his own computer that would need to have a connection only to the phone email server.

According further to the present invention: (a) Email messages can be downloaded only once and only to mobile phones. When user (and his/her phone) is nearby his/her PC/laptop email client on PC would access the emails from the phone via fast proximity connections, (b) Email client on PC can be setup to work only as a thin client and messages are stored on mobile device, which is always with the user, (c) User would be able to use any standard email client on PC/laptop, (d) When mobile device is nearby, PC/laptop user can use PC's or laptop's display and standard keyboard to view/edit cellular messages (SMS, MMS), (e) Email client could be used to view phone call logs and related notes, (f) Only one application (email client) is used for different kind of communications, (g) User experiences seamless integration, (h) There is no need to maintain several contact lists.

A system implementing the invention provides access to phone calls/SMS and e-mails in a uniform way.

Using standard protocols the invention provides the following advantages: (a) The phone's services can be accessed on any PC supporting these email server protocols regardless of hardware platform and operating system, (b) The phone's services can be accessed from any e-mail client, leaving the user the choice of his/her preferred application instead of learning a new one, (c) The user needs only one phonebook and can carry this phonebook with the phone to the workplace, home, public internet places (library, internet coffee) and use a fresh and well-maintained contact list for e-mailing, (d) Easy to reply for messages (SMS, MMS) in less expensive e-mail.

The benefits of getting all types of messages such as calls, SMSs, and emails in a mobile-centric way are very significant because of the always-with-you, always-on feature that such devices are capable of and which is not true for the PC. Reading and writing of messages can be done on the desktop/laptop when convenient.

On the other hand, in a slightly different and less mobile-centric solution, the invention could simply add a new functionality to mobile devices that would allow the device to both act as a client and server in an e-mail system. As a client, the device can download e-mails from the original server for reading, responding, deletion, etc. on the mobile device. The mobile device might use GPRS, Edge, EVDV, EVDO, WiFi, WiMax, WCDMA, or other networks to connect to the primary server. The device subsequently acts as a server to another device such as a laptop or PDA and use a local connection method such as a cable, IrDA, Bluetooth, WiFi, etc. to transfer the previously downloaded e-mails to the other device.

BRIEF DESCRIPTION OF THE DRAWINGS

FIG. 5 shows a graphical user interface (GUI) command description, according to the present invention.

FIG. 7 shows a signal processor that may be used, according to the present invention.

DETAILED DESCRIPTION OF INVENTION

Figure 1:
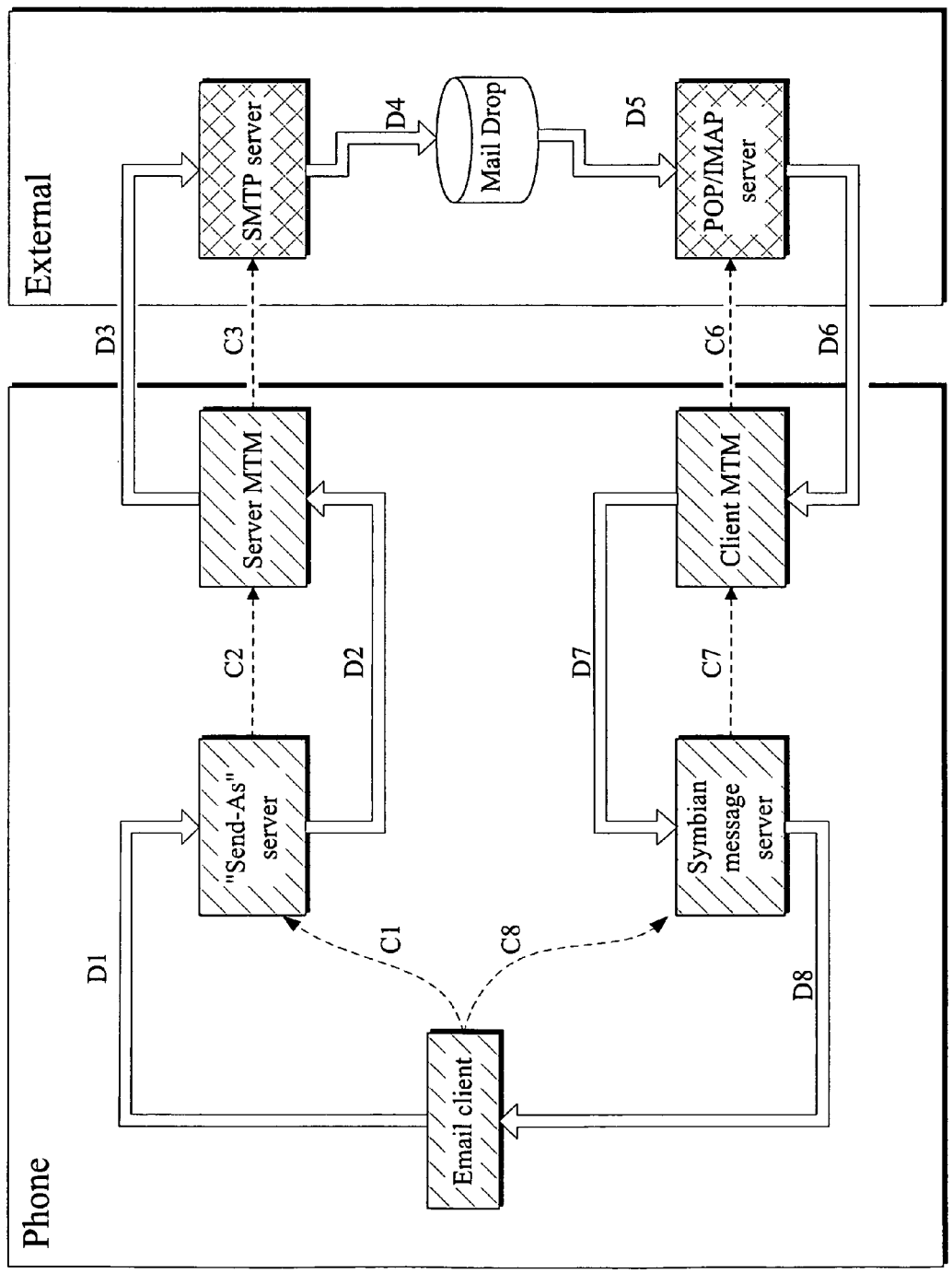
FIG. 1 shows a prior art email client within a phone structure interfaced to external devices.
Figure 2:
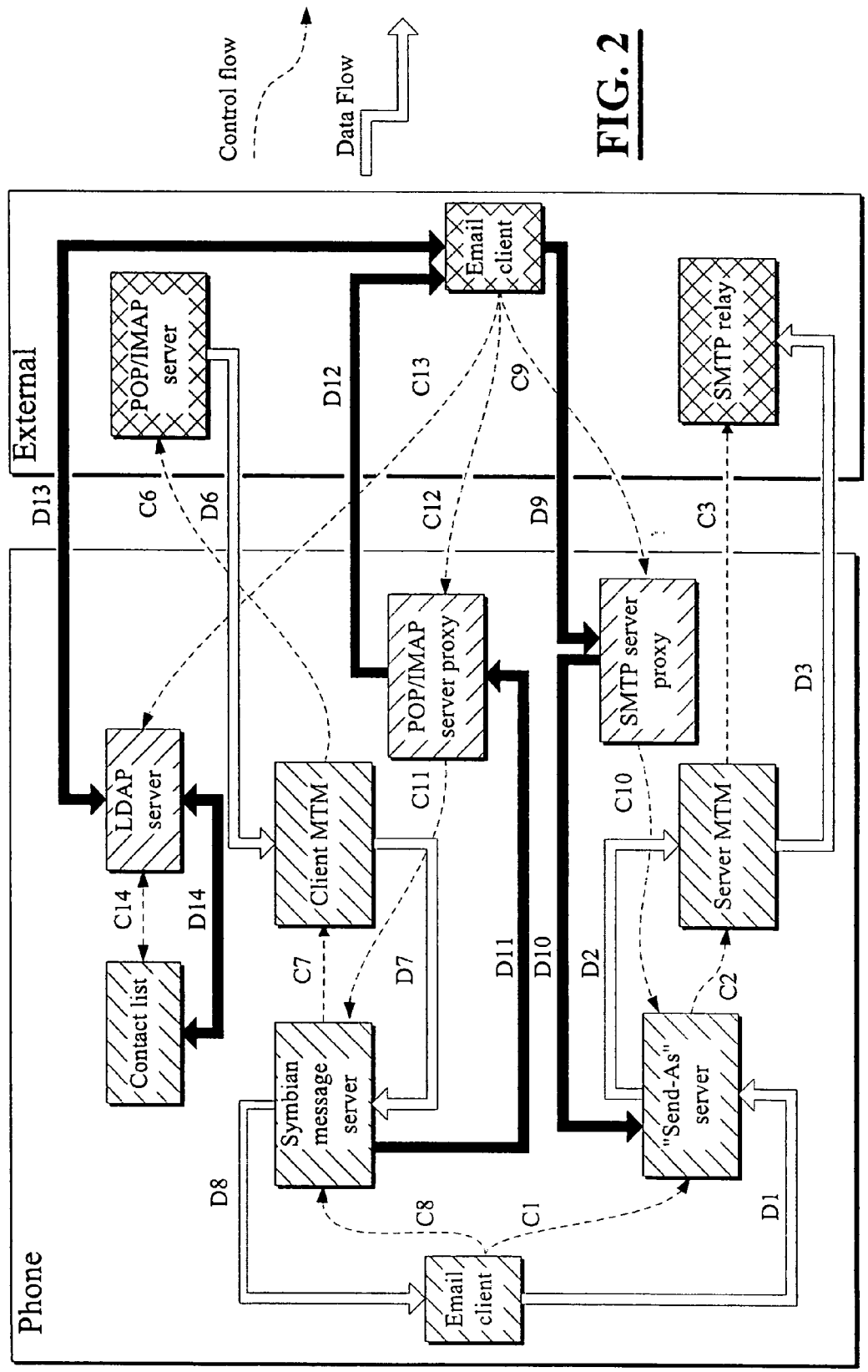
FIG. 2 shows an implementation of the present invention using proxies within a phone structure similar to that of FIG. 1.
Figure 3:
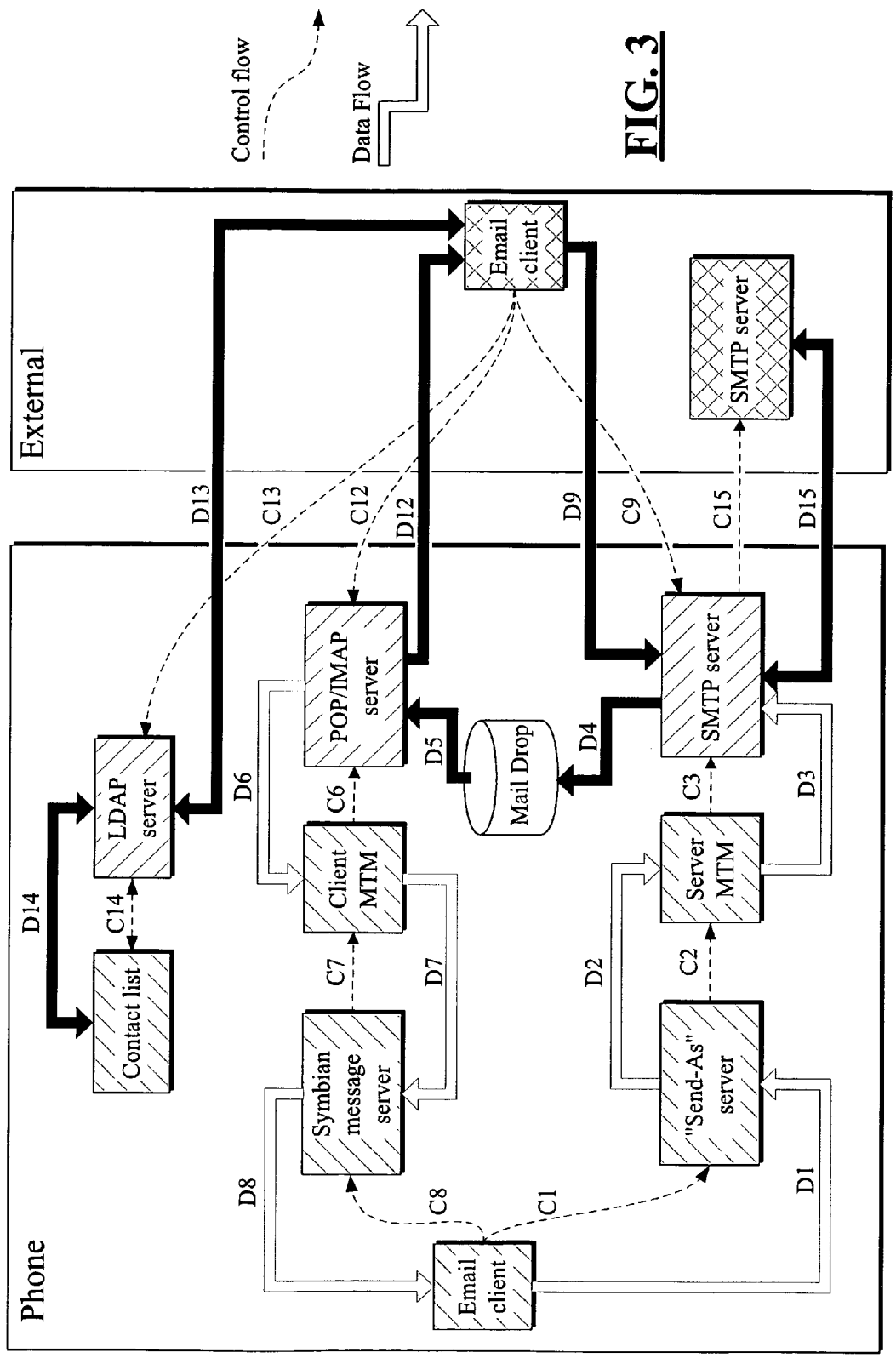
FIG. 3 shows an implementation of the present invention using full-featured servers instead of the proxies of FIG. 2.

Abbreviations
ISP: Internet Service Provider
SMS: Short Message Service
MMS: Multimedia Messaging Service
MTM: Message Type Module
WLAN: Wireless Local Area Network
SMTP: Simple Mail Transfer Protocol (RFC 821)
POP3: Post Office Protocol 3 (RFC 1939)
IMAP: Internet Message Access Protocol (RFC 1730, RFC 2060)
LDAP: Lightweight Directory Access Protocol (RFC 1777)
RFC: Request for Comments FIG. 1 shows a prior art cell phone structure interfaced to external devices. Although the prior art includes such a device with the illustrated structure it should be realized the embodiments of the invention to be disclosed in FIGS. 2 & 3 are merely examples and are not restricted to a cell phone but are generally applicable to any mobile communication device. Moreover, the invention is not restricted to a mobile communication device, as will become apparent by the description which follows. On the left-hand side of FIG. 1 is a mobile communication device e.g., having a cell phone structure and having a mobile messaging client, e.g., an email client able to send and receive email to and from the external SMTP and POP/IMAP devices illustrated on the right-hand side of the Figure. The entity on the right-hand side labelled 'External' does not necessarily stand for a single physical unit. Instead, it should be thought of as e.g. one computer that runs the POP/IMAP server, another hosting the SMTP server and a third one where a mail drop is available for use, plus the connecting network. In other words, 'External' can be taken as the abstraction of the whole Internet. Although not shown, it should also be understood, without being limited thereto, as embracing all the possible radio interfaces for mobile communication devices with all the functionalities that implies. These would include GSM, 3GPP, CDMA, WCDMA, OFDM, Super 3G, 3.9G, LTD, EDGE, GPRS, 4G, WiMAX, UWB, WiFi, EVDV, EVDO, Blueetoooth, IRDA, etc., without limitation. The many possible ways of temporary or permanent hard-wired connection existing between mobile communication devices and desktop or laptop PCs such as Ethernet, USB, Firewire, etc., are also embraced.

Directional data flows are shown by heavy lines, each flow labelled with a capital "D" and a number. A control signal associated with each data flow is labelled "C" with the same number and is shown as a dotted line. A given control signal may have a direction the same as or opposite that of its associated data flow, as shown.

For a prior art email message sent from an email client of the cell phone on the left hand side of FIG. 1 to the external devices on the right-hand side, a data flow D1 from the email client of the phone terminates at a "Send-As" server within the phone under the control of a signal C1 from the email client to the Send-As server. The Send-As server is a simplified generic interface, e.g., to the various Symbian Message Type Modules (MTMs) that can be used to send different types of messages quickly, without paying much attention to the details of different message types. It is a built-in component of the Symbian system. The "Send-As" server provides a data flow D2 to a Server Message Type Module (MTM) within the phone under the control of a control signal C2 from the "Send-As" Server to the Server MTM. The term Server MTM is used as a short common name for the above-mentioned various MTMs that are able to accept data from the user and transfer that data to another location. The Server MTM provides a data flow D3 to an SMTP Server external to the phone under the control of a control signal C3 from the Server MTM to the external SMTP Server. The external SMTP Server provides the email message on a data line D4 to a mail drop, i.e., to a storage device external to the phone. The intended recipient will then be able to obtain the stored email message using a POP/IMAP Server, whether it be the POP/IMAP Server shown or some other similar POP/IMAP server. It should be realized that embodiments of the invention are not limited to a mobile communication device or to a device having a "Send-As" server connected to a Server MTM.

Also shown within the phone on the left hand side of FIG. 1 are a Symbian Message Server and a Client MTM. An email message is retrieved from the external POP/IMAP Server as a data flow D6 under the control of a control signal on a line C6. The Client MTM sends the message on a data flow line D7 to the Symbian Message Server under the control of a control signal on a line C7 from the Symbian message serve to the Client MTM. The Symbian Message Server in turn sends the email message as a data flow D8 to the email client within the phone under the control of a control signal on a line C8 from the email client to the Symbian Message Server. The invention is not limited, however, to a mobile communication device having a Symbian Message Server and a Client MTM.

The prior art cell phone of FIG. 1 is able to send and retrieve email and it can also be used in other types of communications such as SMS and MMS. But while away from the office or home PC, or even while in the office or at home, the user is not easily able or is even unable to coordinate between the messages sent and received while mobile using the mobile device and the messages sent and received using a PC while in the office or at home. In the present environment, the user will likely be encouraged by the PC operating system proprietor to use an integrated contact management application, a Mobility Center and a "Communication History" to in effect view the PC as a messaging hub. As explained above, a major difficulty with this approach is the need for a single tool under the control of a single proprietor.

In keeping with the above prior art background, contrary to the above described PC operating system plans under development, the present invention teaches an inventive unified messaging using for instance Symbian terminals as primary message stores/forwarders (servers) and desktop/phone clients as message producers/consumers (clients). Besides showing functions, the following description of several embodiments also shows high-level implementation details and connections. The teachings hereof can usefully be employed by a software developer team, the technical staff of a customer, etc.

FIGS. 2 and 3 show two separate embodiments of the present invention implemented on a mobile communication device, in this case a cell phone, providing centralized messaging using a message transfer agent according to for instance the following existing protocols: SMTP, POP3, IMAP, and LDAP. These protocols use TCP/IP networking so in such a case a PC must have a TCP/IP connection to the phone. The TCP/IP connection can be established using: (a) wireless technology (e.g., Bluetooth, WLAN, IRDA, or the like), (b) wired connection (e.g., USB or the like), (c) or some other appropriate wireless technology. The assignee hereof has on-going activities to have easy phone-PC connection with such various wireless technologies. The integration of these different messaging protocols and technologies for simplified location-semi-independent single-client access will be described for the embodiments which follow.

The SMTP proxy server of FIG. 2 may implement the basic SMTP protocol described in RFC 2821 and the POP/IMAP proxy server may implement RFC 1939 and RFC 3501 for POP and IMAP protocols. The LDAP proxy server may implement RFC 3377. To enhance portability, the servers may be source-compatible with Symbian V7.0s and later. The GUI will have to be ported if the target is not 80.

Embodiment 1

In this embodiment the primary email handler is the phone's built-in email subsystem. The additional servers running on the phone serve as a bridge between external clients and the phone message handler infrastructure: they accept connections from other clients but the data they transfer is injected into and retrieved from existing message processing facilities. In this case, the phone software collects messages from different POP/IMAP servers on demand, stores them on the phone and passes them to connecting email clients for manipulation (read/reply/delete/etc.).

A simplified schema can be seen in FIG. 2. An SMTP Server Proxy and a POP/IMAP Server Proxy have been added to the prior art structure of FIG. 1, according to the present invention, as message transfer agents. They process messages from an external messaging client installed on a communication device of the user of the inventive mobile communication device. An optional LDAP server may also be added, as shown for interacting with a new or existing Contact list function. All the added servers function as bridges between external clients and the prior art messaging components such as the prior art Symbian messaging components within the illustrated mobile device or phone.

The communications interfaces are shown in FIG. 2. Each interface is presented as one control and one data flow marker. That is, $Interface_{p[p=1, 2, 3 \ldots]} = I_p = (C_p, D_p)$. The control arrow points from controller to controlled and the data arrows point from source to sink. The new interfaces $I_9$, $I_{10}$, $I_{11}$, $I_{12}$, $I_{13}$ and $I_{14}$ are added by this invention, and the others are existing Symbian interfaces as described above in connection with FIG. 1.

The SMTP Server Proxy is the outgoing connection for the external devices such as a desktop email client as shown. The SMTP Server Proxy performs a server process that runs on the mobile phone or terminal. This proxy is responsible for transmission and local delivery of the messages generated by the client software. The $I_9$ interface uses TCP sockets and SMTP protocol (see RFC 2821). The external desktop client on the right hand side of FIG. 2 connects using the SMTP protocol using a control signal C9 and sends MIME (Multipurpose Internet Mail Extensions) formatted rich messages on a data flow line D9 that are parsed by the SMTP Server Proxy and passed on a data flow line D10 to the corresponding Symbian messaging "Send-As" server component under the control of a control signal on a line C10. The SMTP Server Proxy connects to the Symbian Send-As server as a client using Symbian client-server architecture. The communication uses the Symbian messaging API. Since the messages are stored in a Symbian-specific format in the device, they have to be converted between device-internal and MIME formats before being sent on a data flow line D2 to a Server MTM under the control of a control signal on a line C2. From the Server MTM the messages are sent on a data flow line D3 to an external SMTP Relay under the control of a control signal on a line C3. The "Send-As" Server or the Server MTM may perform the conversion to MIME format. The external Email Client shown in FIG. 2 on the right hand side using the SMTP Server Proxy in the mobile communication device on the left hand side could reside in any kind of communication device besides a desktop such as a laptop, a PDA, another kind of mobile communication device, etc.

The external (e.g., desktop) email client can connect to the POP/IMAP Server Proxy using TCP sockets and POP (RFC1939) and/or IMAP (RFC3501) protocols. Of course, it will be realized that the email client resides within an apparatus and that there is necessarily a device connected within that apparatus connected to the email client and that is connectable to the mobile communication device of the user. The POP or IMAP Proxy Server (or both) is a server process that runs on the mobile terminal. It is responsible for serving delivered and stored messages to the clients when they ask for them. A control signal is shown on a line C12 from the external email client to the POP/IMAP Server Proxy. The POP/MAP Server Proxy sends a control signal on a line C11 to the Symbian Message Server within the phone device. According to this embodiment of the present invention, the control signal on the line C7 can be used also to get email from the external POP/IMAP Server via the Client MTM to be sent via the POP/IMAP Server Proxy to the external Email Client. The control signal on the line C6 requests this email and it is sent to the Symbian Message Server via the Client MTM over data flow lines D6 and D7 and from there to the external email client via the POP/IMAP Server Proxy over the data flow lines D11 and D12. The POP/IMAP Server Proxy connects to the Symbian messaging services as a client using Symbian client-server architecture. The communication uses the Symbian messaging API. One or more messages are sent from the Symbian Message Server on the data flow line D11 to the POP/SAP Server Proxy. Since the messages are stored in a Symbian-specific format in the phone device, they have to be converted between device-internal and MIME format before being sent on a data flow line D12 to the connected external client (see RFC2045, RFC2046, RFC2047, RFC2048 and RFC2049). The POP/IMAP Server Proxy may be used to perform this conversion.

In the case of an IMAP Server Proxy, some items shown in a client of the phone's mailbox folders are non-email messages (like SMS/MMS) or are not even messages by their original nature (contacts, calendar entries, tasks for example). These items are converted to textual format as well. An example would be accessing the call log of the mobile device and sending an answer. An external (e.g., desktop) client requests the content of a call log item presented to the client as a special text message. The IMAP Server Proxy fetches a call log item from the messaging system. The given log entry is converted to a text format, e.g., an email item with special X-header fields that identify the item as a call log entry. The converted entry is sent to the desktop email client on the line D12 and it can be displayed using a special format. Replying this generated mail item may result in initiating a new call on the phone or sending a textual message (email/SMS/MMS) to the originating device. If a message is sent, it is passed to the SMTP proxy on the phone on the line D9.

Regarding the 113 interface between the external (e.g., desktop) email client and the LDAP server proxy, the email client can communicate with the LDAP Server Proxy through TCP sockets using the LDAP protocol described in RFC3377.

Embodiment 2

This embodiment provides a full email server implementation. Both the internal clients in the phone and the external clients use the standalone servers running in the phone. A schema for this embodiment is shown in FIG. 3. Notice that the POP/IMAP Server Proxy of FIG. 2 has been replaced by a standalone POP/IMAP Server. Likewise, the SMTP Proxy Server of FIG. 2 has been replaced by a standalone SMTP Server. In this case, a user can tell his internet service provider such as xDSL, Cable, or Satellite provider to send his email to the POP/IMAP server of the mobile phone and the user then gets his email routed through to the mobile automatically, without having to take positive action to collect messages from different POP/IMAP servers on demand. In other words, as between the basically two ways of getting information—push or pull—this solution uses a "push" approach. In the first embodiment, as applied to the "pull" solution of FIG. 2, it means that the portable device has to go to the external POP/IMAP site and ask for information. Thus, the cell phone has to "pull" the information from the server by doing something. "Pushing" on the other hand involves the server sending the mobile device information of a general type previously prearranged to be sent. For instance, the mobile device can inform one or more servers that it is on line and ready to receive whenever they are ready to send. Or, the servers can monitor the mobile device to find out when it is available and send anything that is already ready to be sent or that becomes available during the time that the mobile device is determined to be available. The "push" can be active or directed. In an active push the server interacts with the mobile device by sending all the content to the mobile device upon the client's request such as in embodiment 1. In a directed push the server interacts with the mobile device only occasionally.

Notice that the mobile communication device on the left in FIG. 3 includes, in this embodiment, a mail drop, i.e., a mass storage device capable of storing messages in such a way as to enable the mobile communication device on the left hand side of FIG. 3 to become the center of the user's messaging experience. Such a device could be a hard drive, a flash memory, etc. Instead of having a rather confusing messaging experience as in the prior art as explained previously, the user now has the capability to use his mobile communication device in a unified, centralized manner with respect to messaging. Since the mobile communication device is presumably always with the user, it is in the best position to fulfill such a role, which is a completely new and powerful way of enabling the modem user of mobile communication devices to operate in the messaging environment and to thereby to make the user's messaging experience more efficient and effective across all kinds of different messaging, not just email. As explained in the previous paragraph, the mobile communication device on the left hand side of FIG. 3 may receive email pushed from an external mail server such as might reside in the user's ISP. The email client within the mobile communication device on the left can initiate the retrieval of such messages by sending a control signal on the line C8 to the Symbian Message Server which in turn sends a control signal on the control line C7 to the client MTM. The client MTM sends a control signal on a line C6 to the POP/IMAP server which has already retrieved or retrieves at that time any incoming messages intended for the user or client. The messages are provided on a data line D6 to the client MTM which in turn transfers the retrieved messages on the data line D7 to the Symbian Message Server which in turn provides the retrieved messages on the line D8 to the email client within the phone for access by the user using a user interface of the phone. Similarly, the email client of the phone may send a message by initiating a message transfer on a data line D1 to the Send-As server under the control of a control signal on a line C1 from the email client to the Send-As server. The Send-As server sends the outgoing message on the data line D2 to the server MTM under the control of a control signal on a line C2 from the Send-As server to the server MTM. The server MTM sends the outgoing message on the line D3 to the SMPTP server within the phone under the control of a control signal on the line C3. Depending on the nature of the message, it could be sent on a data line D15 to an external SMTP server shown on the right hand side of FIG. 3 under the control of a control signal on a line C15. Or, it could be sent internally from the SMTP server on a data line D4 to the mail drop for pickup by the POP/IMAP server over a data line D5 either at that time or subsequently on demand from an external email client (also belonging to the user but resident on another terminal device) using a control signal on a line C12 to cause the message to be sent from the POP/IMAP server on a data line D12 to the external email client. Notice that the external client may also retrieve messages residing in the mail drop that have come from the ISP of the user or that have come to reside in the mail drop from other sources that are not shown in FIG. 3. In such cases, the external email client may send a control signal on the line C12 to the POP/IMAP server which in turn retrieves the desired messages of the user from the mail drop on the data line D5 and sends them onward to the external email client on the data line D12. In this way, another communication device of the user that is external to the mobile communication device on the left of FIG. 3 can participate in the messaging experience of the user but still using the mobile communication device on the left as the central entity in the entire now completely centralized messaging experience of the user.

Use of the embodiments of FIGS. 2 and 3 will solve the problems of users of today's messaging facilities: different types of messages require the usage of different hardware devices and several separate and non-interoperable software packages with different addressing schemes, despite their ultimate raison d'être being the same i.e., to deliver a message to the addressee. As outlined above, the present invention comprises adding a message transfer agent to the prior art mobile communications device and the added agent can take the form of for example, an SMTP server, an SMTP proxy and/or a POP/IMAP server or proxy. An LDAP proxy can be implemented to enhance addressing capabilities of the clients. Customization of the client side might be necessary to be able to fully use the offered functions. Use cases are summarized in FIG. 4. The use case descriptions use numbering and lettering for paragraphs. Numbering always implies strict ordering of the same-level items; lettering does not impose any restrictions on execution order.

It should be appreciated that the present invention can be carried out in the form of a computer program stored on a computer readable medium having programming code stored thereon for causing a mobile communication device such as the phone of a user on the left hand side of FIG. 2 or 3 within which the medium is installed or is installable to act as a central message transfer agent for processing messages of the user to and from an email client also resident on the mobile communication device and also to and from one or more messaging clients installed in corresponding terminal devices used by the user that are external to the mobile communication device of the user. Similarly, an integrated circuit could be used instead of a computer program in the same way.

Although sometimes used in the art to refer only to an SMTP server, it should be understood that the term "message transfer agent" is used herein in the more generic sense of comprising one or more of the LDAP server, POP/IMAP server proxy, or SMPTP server proxy of FIG. 2. Similarly, the term is used to cover one or more of the LDAP server, POP/IMAP server, mail drop, or SMTP server of FIG. 3. It can also be understood as including one or more of the devices shown in the phone on the left hand side of FIG. 1 including the Send-As server, the server MTM, the Symbian Message Server, or the client MTM. It will be appreciated that all of these devices will normally be carried out as software entities embodied in programming code or their hardware equivalents. It is also possible to use a general purpose signal processor such as shown in FIG. 7 including typical components found in such general purpose devices such as a clock, a random access memory, a read only memory, an input/output device, and various other devices all interconnected by data, address, and control lines.

Regarding the external devices of the user, such can be viewed as communication terminals of that user, each comprising an email client, and a communication device connected to an email client and connectable to the mobile communication device of the user, for instance shown on the left hand side of FIGS. 2 and 3. The signal processor of FIG. 7 could be used and the input/output device therein would serve as the above-mentioned communication device while the email client would be embodied in executable code. The mobile communication device on the left hand side comprises a messaging client for originating and terminating messages from and to the user of the mobile communication device and a message transfer agent for processing messages including messages communicated between any external terminal of the user and the mobile communication device. Such messages can include messages originated or intended for the user and which are communicated between the mobile communication device of the user which is acting in a central messaging role and other terminal devices of the user.

Figure 4:
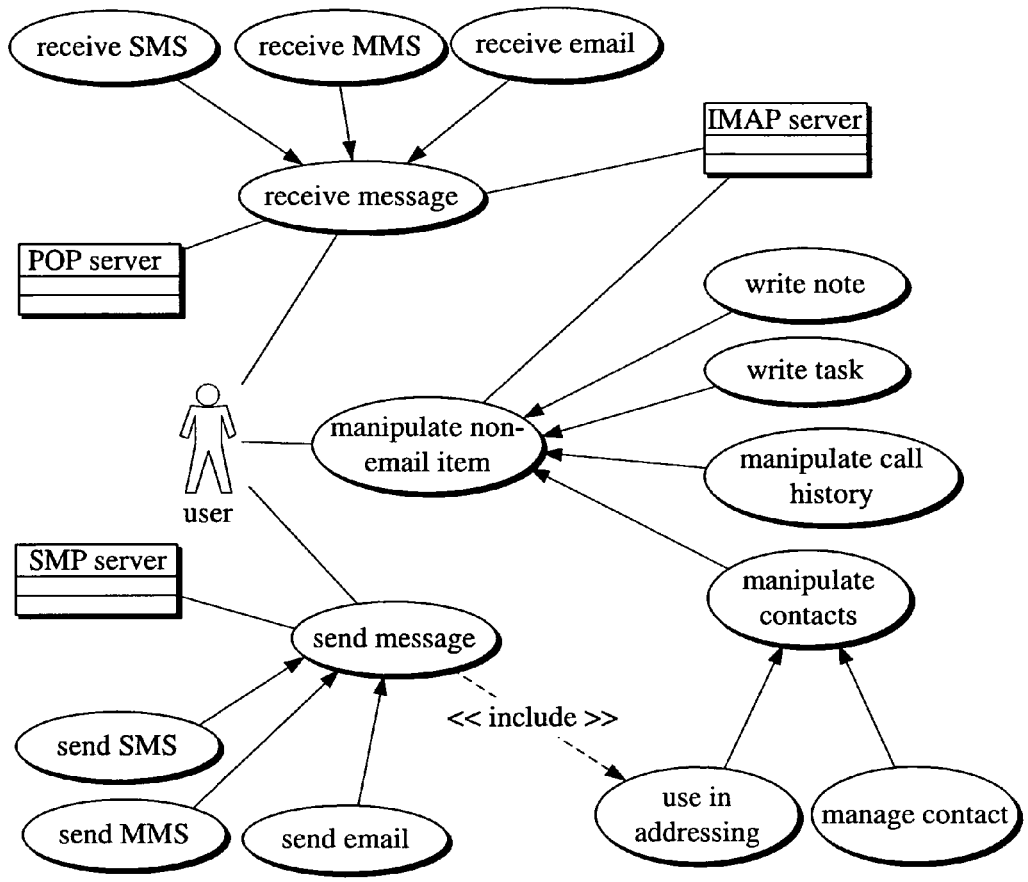
FIG. 4 shows main use cases, according to the present invention.

FIG. 4 shows some non-limiting main use cases, according to the present invention. Targeted users are users in general but could be members of a company for instance who are likely to move among different locations spending relatively long periods of time at each place during their normal everyday work experience. They may be trained to use traditional desktop messaging client software.

Office Use Cases:

1. Prologue
   1. The mobile device is a member of a wireless mail-capable network all the time.
   2. The user comes to his desk at the office and puts his device on the table.
   3. The office communication infrastructure detects the presence of the device and establishes a peer-to-peer connection. (WLAN, Bluetooth, IRDA, etc.)
   4. The messaging client of the desktop PC is notified by the communications infrastructure about the presence of the mobile device.

The desktop PC messaging client connects to the mobile device and starts using it as messaging gateway.

2. Message Handling
   A. Receiving and sending email/SMS/MMS
      a) Upon arrival of a new message, the POP/IMAP proxy assuming e.g. the phone of FIG. 2 is notified by a Symbian message server. The proxy keeps track of the status of these messages.
      b) When connected email client fetches a mail item, the remembered items are transferred by the POP/IMAP proxy (and converted to email format on the fly in case of non-emails items, like SMS, MMS, etc.) directly from the Symbian message store tree.
      c) The connected email client sends an email item to the SMTP proxy. Based on the destination address and possible transport preference markers, the message is converted to the required format and is passed to the Symbian "Send-as" server for further processing.
      Note: Reply to an item can use different service, e.g.: reply to an email can be sent as SMS, reply to a missed call can be sent as email and/or SMS/MMS, etc.
   B. Manipulate call history
      1. The user receives a phone call.
      2. A new call history item is available as a new empty message/note/task/calendar item addressed to the caller.
      3. The user takes some notes using the desktop client while speaking.
      4. When the call is over the message is updated to show call duration.
      5. The updated message can be sent to the addressee as message/note/task/calendar item or saved for future reference.
   C. Manipulate Contacts
      A. Addressing
         1. The user creates a new message of the desktop client.
         2. Destination address popup shows names for the phone contact list.
         3. Message type dependent address details are fetched from the phone an are inserted into the message.
      B. Manage contacts
         1. The user creates or edits a contact database item on either the desktop client or the phone. Whichever device is used, the data is stored on the phone contact list and is available for addressing on both devices (internally on the phone, via LDAP on the desktop client).
   The changes are visible on the other device as soon as the edited items is saved.

3. Epilogue
   1. Upon leaving the company network the mobile device switches to e.g. VPN and all messaging functions are still available on the device without using expensive cellular services.
   The cellular/non-cellular connection type preferences should be based on cost calculations.
   2. The desktop PC messaging client switches back to the company internal messaging network (if the PC is a shared device) or just suspends its operation (in case it is a dedicated personal computer).

Figure 6:
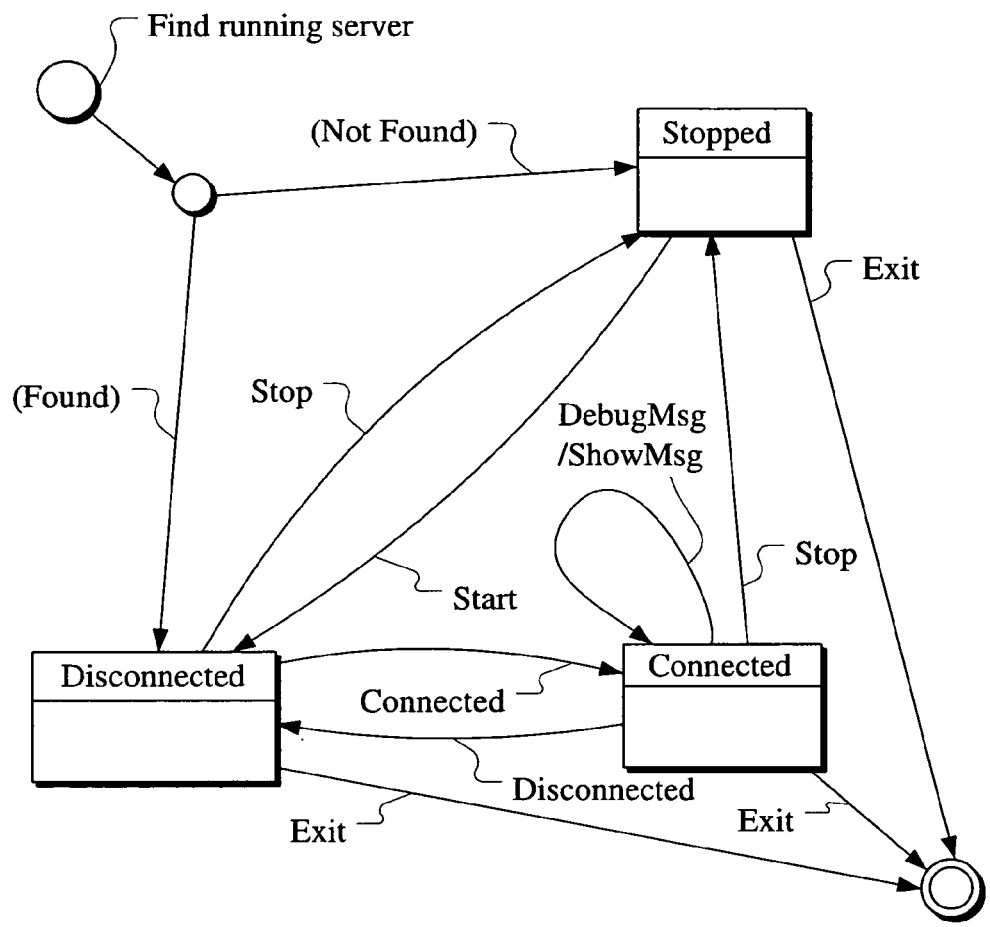
FIG. 6 shows a state machine of the GUI of FIG. 5

Referring now to FIG. 5, a graphical user interface (GUI) command description is shown to describe a state machine shown in FIG. 6. The servers or server proxies shown in FIG. 2 and FIG. 3 optionally can have a simple GUI for starting, stopping, tracing and in general using the servers. When the GUI is connected to a running server, "debug" messages can be seen in a text editor as a read-only document. The states and valid commands are listed in the table of FIG. 5 and should be understood in conjunction with the state machine of FIG. 6. The GUI should connect to the servers using for instance a standard Symbian socket API. The servers may send diagnostic output to the opened socket. Any data sent to the server on the same socket may be implemented as a termination request. Server diagnostic messages may be written into a server log file and sent to the connected clients. As for speed, mobile operating systems such as Symbian widely use-threaded cooperative multitasking in client-server implementations. Consequently, actions or requests must be short execution sequences to avoid excess blocking of the active scheduler. Longer operations must be broken up into smaller chunks. If this is not feasible, they have to be performed in a separate thread. Since mobile terminals have relatively small amounts of memory, the server proxies must not keep local copies of the messages any longer than it is necessary to pass them to the next entity in the chain.

On the other hand, another less mobile-centric implementation would simply add software that resides on a mobile device that performs the following functions:
(a) downloads e-mails from server to handset;
(b) provides a user interface so user can read and respond to e-mails on the handset;
(c) maintains copies of downloaded and sent e-mails;
(d) provides communications interface via Bluetooth, IRDA, WiFi, UWB, or other media to a secondary device;
(e) acts as a local e-mail server for the secondary device such as laptop or PDA—retrieved e-mails are deleted, acts as intermediary to send outgoing e-mails;
(f) acts as a conduit to allow the download to the secondary device of any previously un-downloaded or new messages;
(g) provides a user interface that allows a user to easily determine whether e-mails have been received/sent.

Such an implementation has the advantage of decreasing the total transfer time for e-mails when a mobile phone is used in conjunction with a laptop. The mobile phone is always on and receiving e-mails as they are pushed to the phone. A laptop or PDA is usually kept off when mobile, but the invention allows the e-mails to already be downloaded and available to the secondary device when the laptop is booted.

Although the invention has been shown and described with respect to specific embodiments, thereof, it should be realized that many other embodiments are possible within the scope of the appended claims.

REFERENCES

[RFC2821] Simple Mail Transfer Protocol
[RFC1939] Post Office Protocol—Version 3
[RFC3501] IMAP—Version 4rev1
[RFC3377] Lightweight Directory Access Protocol (v3): Technical Specification
[RFC2045] Multipurpose Internet Mail Extensions (MIME) Part One:
Format of Internet Message Bodies
[RFC2046] Multipurpose Internet Mail Extensions (MIME) Part Two: Media Types
[RFC2047] MIME (Multipurpose Internet Mail Extensions) Part Three:
Message Header Extensions for Non-ASCII Text
[RFC2048] Multipurpose Internet Mail Extensions (MIME) Part Four:
Registration Procedures
[RFC2049] Multipurpose Internet Mail Extensions (MIME) Part Five:
Conformance Criteria and Examples

The invention claimed is:

1. An apparatus comprising:
at least one processor; and
at least one memory including computer program code, the at least one memory and the computer program code configured to, with the at least one processor, cause the apparatus to perform at least the following,
upon receiving an object of communication via a network, convert the object of communication of a first application type into a converted object of communication of a second application type, wherein the first and second application types are different, and one of the application types is associated with an email application, a short message service application, a multimedia messaging service application, a calling application, a voice messaging application, an instant messaging application, or an internet chat application,
execute one or more functions of an internal simple mail transfer protocol server, an internal post office protocol server, an internal internet message access server, or a combination therefore, and
initiate a transmission of a response to the object of communication or to the converted object of communication including the converted object of communication via the network to one or more external communication terminal devices,
wherein the response is of the second application type, and
wherein the apparatus is within a mobile communication terminal device.

2. An apparatus of claim 1, wherein the apparatus is further caused to:
receive one or more user inputs via a note taking application during a time period of the receiving of the object of communication, wherein the transmission of the response with the converted object of communication includes the one or more user inputs wherein the apparatus further comprises the internal simple mail transfer protocol server.

3. An apparatus of claim 2, wherein the apparatus is further caused to:
incorporate the time period, the one or more user inputs, the response, and the converted object of communication into a communication history item; and
store the communication history item in the mobile communication terminal device,
wherein said internal simple mail transfer protocol server is configured to store messages from the one or more external communication terminal devices to the at least one memory for access by the apparatus and the one or more external communication terminal devices.

4. An apparatus of claim 3, wherein the apparatus is further caused to:
format the communication history item into a task or calendar item addressed to a sending device of the object of communication; and
store the task or calendar item in the mobile communication terminal device, wherein the apparatus further comprises the internal post office protocol server or the internal internet message access protocol server that is configured to retrieve said messages.

5. An apparatus of claim 4, wherein the apparatus is further caused to:
initiate a transmission of the task or calendar item via the network to the sending device, wherein said internal post office protocol server or said internal internet message access protocol server is configured to retrieve a message stored at the at least one memory by said internal simple mail transfer protocol server via an internal send-as server.

6. An apparatus of claim 5, wherein said internal post office protocol server or said internal internet message access protocol server is configured to retrieve the messages stored at the at least one memory.

7. An apparatus of claim 6, wherein the one or more of the external communication terminal devices access the apparatus via said internal post office protocol server or said internal internet message access protocol server.

8. An apparatus of claim 7, wherein the apparatus further comprises a client message type module having access to the at least one memory via said internal post office protocol server or said internal internet message access protocol server for forwarding messages from the one or more external communication terminal devices or said internal simple mail transfer protocol server to the at least one processor.

9. An apparatus of claim 8, wherein the apparatus further comprises a mobile operating system message server for forwarding said messages from said client message type modules to the at least one processor.

10. An apparatus of claim 9, wherein the apparatus further comprises an internal lightweight directory access protocol server for exchanging contact information between the one or more external communication terminal devices and said apparatus.

11. An apparatus of claim 2, wherein said internal simple mail transfer protocol server is a server proxy.

12. An apparatus of claim 11, wherein the apparatus further comprises an internal send-as server that is configured to forward a message obtained from said internal simple mail transfer protocol server proxy to a server message type module of the apparatus for transfer to an external simple mail transfer protocol relay, the message being obtained from the one or more external communication terminal devices.

13. An apparatus of claim 12, wherein said send-as server is configured to forward a message to said external simple mail transfer protocol relay via said server message type module.

14. An apparatus of claim 11, wherein the apparatus further comprises an internal post office protocol server proxy or an internal internet message access protocol server proxy.

15. An apparatus of claim 2, wherein the apparatus further comprises an internal post office protocol server proxy or an internal internet message access protocol server proxy for forwarding a message from an external post office protocol server or an external internet message access protocol server to the one or more of the external communication terminal devices.

16. An apparatus of claim 15, wherein the apparatus further comprises a client message type module and a mobile operating system message server, and said internal post office protocol server proxy or said internal internet message access protocol proxy receives said message from said external post office protocol server or said external internet message access protocol server via said client message type module and said operating system message server.

17. An apparatus of claim 16, wherein said message from said external post office protocol server or said external internet message access protocol server is provided via said client message type module and said mobile operating system message server either to the at least one processor or to said internal post office protocol server proxy or said internal internet message access protocol server proxy.

18. An apparatus of claim 17, further comprising a lightweight directory access protocol server for exchanging contact information between the one or more of the external communication terminal devices and said apparatus.

19. An apparatus of claim 2, wherein the apparatus further comprises the internal post office protocol server or the internal internet message access protocol server.

20. An apparatus of claim 1, wherein the apparatus further comprises the internal post office protocol server or the internal internet message access protocol server.

21. An apparatus of claim 20, wherein said internal post office protocol server or said internal internet message access protocol server is a server proxy.

22. An apparatus of claim 1, wherein the apparatus further comprises a state machine for providing a graphical user interface for starting, stopping, and using said apparatus.

23. An apparatus of claim 22, wherein said state machine has connected, disconnected, and stopped states.

24. An apparatus of claim 23, wherein a transition is made to said stopped state from an initial state if a running instance of a searched for the apparatus is not found and a transition to said disconnected state is made from said initial state if found.

25. An apparatus of claim 24, wherein start and stop transactions are provided between said stopped state and said disconnected state.

26. An apparatus of claim 22, wherein a transition is made from a stopped state to a disconnected state in response to a start command, and wherein a transition is made from said disconnected state to said stopped state in response to a stop command.

27. An apparatus of claim 26, wherein a transition is made from said disconnected state to a connected state in response to a connect command, and wherein a transition is made from said connected state to said disconnected state in response to a disconnect command.

28. An apparatus of claim 27, wherein a transition is made from said connected state to said stopped state in response to a stop command.

29. An apparatus of claim 28, wherein a transition is made from said disconnected state, from said connected state, or from said stopped state to said initial state in response to an exit command.

30. An apparatus of claim 22, wherein a transition is made from a disconnected state to a connected state in response to a connect command, and wherein a transition is made from said connected state to said disconnected state in response to a disconnect command.

31. An apparatus of claim 30, wherein a transition is made from said connected state to a stopped state in response to a stop command.

32. An apparatus of claim 1, wherein the apparatus is further caused to: fetch object-type-dependent address information from the mobile communication terminal device, and insert the fetched address information into the converted object.

33. An apparatus of claim 1, wherein the converting of the objects are executed on the fly.

34. An apparatus of claim 1, wherein contact data of a user stored on the mobile communication terminal device is available for addressing on the mobile communication terminal device and the one or more external communication terminal devices.

35. An apparatus of claim 34, wherein a change to the contact data on either the mobile communication terminal device or the one or more external communication terminal devices is visible for the mobile communication terminal device and the one or more external communication terminal devices in response to the change being saved at either the mobile communication terminal device or the one or more external communication terminal devices.

36. An apparatus of claim 1, wherein the object of communication is either addressed to a user or addressed to another user by the user, and the mobile communication terminal device and the one or more external communication terminal devices belong to the user.

37. A method, comprising:
  upon receiving an object of communication via a network, converting, by an apparatus, the object of communication of a first application type into a converted object of communication of a second application type, wherein the first and second application types are different, and one of the application types is associated with an email application, a short message service application, a multimedia messaging service application, a calling application, a voice messaging application, an instant messaging application, or an internet chat application,
  executing, by the apparatus, one or more functions of an internal simple mail transfer protocol server, an internal post office protocol server, an internal internet message access server, or a combination therefore, and
  initiating, by the apparatus, a transmission of a response to the object of communication or to the converted object of communication including the converted object of communication via the network to one or more external communication terminal devices,
  wherein the response is of the second application type, and
  wherein the apparatus is within a mobile communication terminal device.

38. A method of claim 37, further comprising:
  fetching object-type-dependent address information from the mobile communication terminal device, and
  inserting the fetched address information into the converted object.

39. A method of claim 37, wherein the converting of the objects are executed on the fly.

40. A method of claim 39, wherein contact data of a user stored on the mobile communication terminal device is available for addressing on the mobile communication terminal device and the one or more external communication terminal devices.

41. A method of claim 40, wherein a change to the contact data on either the mobile communication terminal device or the one or more external communication terminal devices is visible for the mobile communication terminal device and the one or more external communication terminal devices in response to the change being saved at either the mobile communication terminal device or the one or more external communication terminal devices.

42. A method of claim 37, wherein the object of communication is either addressed to a user or addressed to another user by the user, and the mobile communication terminal device and the one or more external communication terminal devices belong to the user.

43. A method of claim 37, further comprising:
  rendering a presentation of the converted object of communication at a user interface of the mobile communication terminal device.

44. A mobile communication terminal device, comprising:
  a central message transfer agent configured:
  upon receiving an object of communication via a network, to convert the object of communication of a first application type into a converted object of communication of a second application type, wherein the first and second application types are different, and one of the application types is associated with an email application, a short message service application, a multimedia messaging service application, a calling application, a voice messaging application, an instant messaging application, or an internet chat application,
  to execute one or more functions of an internal simple mail transfer protocol server, an internal post office protocol server, an internal internet message access server, or a combination therefore, and
  to initiate a transmission of a response to the object of communication or to the converted object of communication including the converted object of communication via the network to one or more external communication terminal devices,
  wherein the response is of the second application type.

45. A communication terminal device of claim 44, wherein said central message transfer agent comprises the internal simple mail transfer protocol server or an internal simple mail transfer protocol server proxy.

46. A communication terminal device of claim 44, wherein said central message transfer agent further comprises the internal post office protocol server or an internal post office protocol server proxy.

47. A communication terminal device of claim 46, wherein said central message transfer agent comprises a lightweight directory access protocol server.

48. A communication terminal device of claim 44, wherein said central message transfer agent comprises the internal post office protocol server or an internal post office protocol server proxy.

49. A non-transitory computer readable storage medium carrying one or more sequences of one or more instructions which, when executed by one or more processors, cause an apparatus to at least perform the following steps:
  upon receiving an object of communication via a network, converting the object of communication of a first application type into a converted object of communication of a second application type, wherein the first and second application types are different, and one of the application types is associated with an email application, a short message service application, a multimedia messaging service application, a calling application, a voice messaging application, an instant messaging application, or an internet chat application,
  executing one or more functions of an internal simple mail transfer protocol server, an internal post office protocol server, an internal internet message access server, or a combination therefore, and
  initiating a transmission of a response to the object of communication or to the converted object of communication including the converted object of communication via the network to one or more external communication terminal devices,
  wherein the response is of the second application type, and
  wherein the apparatus is within a mobile communication terminal device.

* * * * *